United States Patent [19]

Carter et al.

[11] Patent Number: 4,682,654

[45] Date of Patent: Jul. 28, 1987

[54] ENZYMATICALLY-TREATED GUAR GUMS

[75] Inventors: Walter H. Carter; Vinai K. Srivastava, both of Dalton, Ga.

[73] Assignee: Millmaster Onyx Group, Inc., New York, N.Y.

[21] Appl. No.: 917,032

[22] Filed: Oct. 9, 1986

Related U.S. Application Data

[62] Division of Ser. No. 736,667, May 22, 1985.

[51] Int. Cl.$^4$ ............................................. E21B 43/26
[52] U.S. Cl. ................................. 166/308; 252/8.551; 435/274
[58] Field of Search ............... 166/246, 308, 281, 283, 166/271; 435/274, 267, 72, 281; 252/8.55 R, 8.55 D; 426/48, 49, 52, 573

[56] References Cited

U.S. PATENT DOCUMENTS

| | | | |
|---|---|---|---|
| 3,483,121 | 12/1969 | Jordan | 166/308 X |
| 3,948,325 | 4/1976 | Winston et al. | 166/308 |
| 3,966,618 | 6/1976 | Colegrove | 166/246 X |
| 4,010,071 | 3/1977 | Colegrove | 435/72 |
| 4,165,257 | 8/1979 | Stokke | 166/246 X |
| 4,326,037 | 4/1982 | Griffith et al. | 166/246 X |

Primary Examiner—Stephen J. Novosad
Attorney, Agent, or Firm—Arthur A. Jacobs

[57] ABSTRACT

A method of recovering oil from an oil-bearing formation by fractionation, utilizing as oil-recovery means aqueous guar gum compositions having a very low content of insolubles, the compositions being formed by impregnating free-flowing solid, particulate guar gum with one or more hydrolytic enzymes and thereafter dissolving the particles of guar gum in water.

1 Claim, No Drawings

ENZYMATICALLY-TREATED GUAR GUMS

This application is a division of application Ser. No. 736,667, filed May 22, 1985.

This invention relates to enzymatically-treated guar gums, and it particularly relates to free-flowing, enzymatically-treated guar gum solids which, upon dissolving in water, produce viscous solutions containing a relatively low content of insoluble residue.

Guar gum is a hydrophilic polysaccharide. One of its important utilities is the preparation of very viscous aqueous solutions or dispersions which are used in high-pressure formation fracturing during oil recovery operations.

One of the prime difficulties heretofore encountered with the use of guar gum solutions and dispersions in oil recovery operations was that they contained an inordinate amount of suspended insoluble material which tended not only to plug up the pores and flow channels of the petroleum formations that already existed but also the new channels created by the formation fracturing operations. This, of course, seriously impeded the flushing and sweeping effectiveness of the viscous fluid.

Furthermore, since the blocked flow channels were the very same conduits through which the viscous fluids had to return when the pressure was released, their blockage caused the fluids to remain imprisoned in the formation, thereby hindering the use of any other recovery techniques.

One of the reasons why the use of guar gum in oil recovery has been plagued by the aforementioned plugging effects is because the insoluble matter in guar gum solutions or dispersions is not composed of the usual visible, rigid particles ordinarily encountered as insoluble material, but is composed of translucent, insoluble, gel-like aggregates of polymeric material. Since these particles do not have rigid shapes and are easily deformed, they can flow into and fill up even small and irregular crevices and other spaces that rigid particles could not enter. Consequently, even a small amount of this material may block a large number of narrow passageways. However, since small amounts of this material have an undue amount of blocking effect, even a small reduction in the concentration thereof could result in a relatively large reduction in blockage.

Other materials, such as xanthan gum dispersions, have also heretofore been used in oil recovery operations, although guar gum is preferred. Like guar gum, xanthan gum forms very viscous aqueous fluids which contain insoluble matter. However, it has, heretofore, been possible to reduce the amount of xanthan insolubles. Such methods of reducing insolubles are disclosed, for example, in U.S. Pat. Nos. 3,966,618 and 4,010,071, which teach the addition of a protease enzyme to aqueous xanthan dispersions, in U.S. Pat. No. 3,119,491 which teaches the addition of enzymes to xanthan dispersions, followed by filtration, in U.S. Pat. No. 4,165,257 which teaches the addition of enzymes and alkali to xanthan dispersions, and in U.S. Pat. No. 4,431,734 which teaches the addition, first, of a polysaccharase, then of a protease, in successive steps, to aqueous xanthan dispersions. None of these processes, however, is completely satisfactory for guar gum.

In accordance with the present invention, there is provided a method of preparing aqueous guar gum solutions that have a lower content of insolubles than was possible by using heretofore known methods. By means of the present method, guar gum solid flakes, or powder, in the free-flowing solid state, is treated with an aqueous solution of one or more hydrolytic enzymes. This treatment reduces the insolubles in the guar. The enzyme solutions may be applied by spraying them onto, and impregnating into, the solid guar gum particles as they are being mixed, or by any other feasible application which acts to distribute the liquid evenly over and into the solid particles.

The quantity of aqueous enzyme solution that is added to the solid guar gum should be small enough to keep the hydrated guar gum in the solid free-flowing state. However the concentration of enzyme should be high enough to react sufficiently with the solid guar gum so that eventually, when the solid treated guar gum is dissolved in water, the resultant viscous solution will have a very low content of insolubles.

It is, to be noted that any reaction between the enzymes and the guar gum in the method of the present invention, takes place in the solid phase, not in solution.

The present treatment usually reduces the insolubles content of guar gum by about 2%. This is a significant decrease considering that the insolubles content of untreated guar gum is about 7% to 8%.

Among the advantages of the present invention are the following:

(1) The temperature at which the enzyme solution is added to the solid is generally in the range of about 20° C. to about 60° C., which is not sufficiently high to deleteriously affect either the enzymes or the guar gum. In addition, the contact time required for enzymatic treatment is relatively short, i.e. between about 15 to 120 minutes. In contrast, the usual procedure for dissolving enzymes in viscous gum solutions often requires much higher temperatures and much longer contact times, either of which may result in decomposition of one or both of the components. Furthermore, it may result in a reduction of the viscosity.

(2) Another advantage of the present invention is that when the enzymatically treated solids are dissolved in water to make viscous solutions, no filtration is required since the concentration of insolubles is relatively low. In addition, the hydration of the solid guar gum with the enzyme solution is carried out preferably at a pH of between 6 and 9; therefore, the viscosity of the guar gum solution is not affected by strong alkaline or acidic conditions.

(3) Another advantage is that the free flowing hydrated guar gum solid produced in acccordance with the present invention may be easily stored and transported because of its solid stable character, and, yet, it may be dissolved in water, in a single step, to produce a viscous solution with a relatively low content of insoluble material, thereby avoiding the time-consuming and inconvenient necessity of dissolving enzymes in viscous solutions and waiting for a reaction to occur.

(4) Another advantage of the present invention is that the dry free-flowing solid produced thereby is capable of participating in many chemical reactions, such as, for example, carboxymethylation with sodium monochloroacetate, hydroxyethylation with ethylene oxide, hydroxypropylation with propylene oxide, and cyanoethylation with acrylonitrile.

The residue content of guar used for hydraulic fracturing is generally described on a weight for weight basis. Thus, a guar which is said to contain 8% residue would leave a residue of 80 lbs. for every 1000 lbs. of gum.

The amount of residue is determined by the so-called "Residue After Break" test, and is referred to as "% RAB". 7% RAB or 8% RAB, which is what is found in untreated guar, is sufficiently high to impair permeability in a petroleum formation, thereby decreasing oil recovery.

The following Example 1 shows the determination of %RAB:

EXAMPLE 1

A base gel solution of 0.6% guar gum is made by hydrating 1.2 grams of guar gum accurately weighed in 200 grams of deionized water, and buffering the fluid at about pH 6.8 with 1.0 gram of monosodium phosphate and 1.0 gram of disodium phosphate. When the guar gum is completely hydrated, add and dissolve 0.12 grams of oxidizing breaker sodium persulfate.

A 150 gram aliquot of the above fluid is placed in a clean 250 ml. beaker and the beaker is sealed with "Saran" wrap and tape. The beaker and contents are then left at a constant temperature of 65° C. for 24 hours.

The mixture is cooled and filtered through a numbered filter paper that has been previously washed, dried and accurately weighed. The filter paper and contents are dried and the weight of the residue is determined by the difference.

EXAMPLE 2

The % RAB of several batches of guar gum were determined both before and after treatment. The before and after analyses of each batch were determined simultaneously in order to reduce any ambient effects. The before treatment determinations averaged 7.40% RAB, The after treatment determinations averaged 5.47% RAB.

EXAMPLE 3

The RAB test was performed in the manner disclosed in Example 1, with the guar gum pre-treated with various percentages of Alcalase 1.5P enzyme. The results were as follows:

| (1) % Alcalase 1.5 P (based on wt. of gum) | 0 | 0.0125 | 0.100 | 0.200 | 0.400 | 0.500 | 5.00 |
|---|---|---|---|---|---|---|---|
| (2) %, RAB | 7.40 | 7.34 | 6.51 | 6.08 | 5.86 | 5.47 | 5.29 |

These determinations were performed simultaneously.

Although higher concentrations than 5.0% of proteolytic enzyme may be used to lower the RAB, it has been found that peak effectiveness with the least amount of enzyme is provided within the range of 0.2% to 5.0% enzyme concentration, based on the weight of the guar gum.

The following example demonstrates that natural, derivatized, and mixed natural and derivatized guar gums are clearly benefited by a proteolytic enzymatic treatment. The derivatized guar used was hydroxypropyl guar gum.

EXAMPLE 4

| | Natural Guar | Hydroxypropyl Guar (HPG) | 80% Natural & 20% (HPG) |
|---|---|---|---|
| (1) Control-before enzyme treatment, % RAB | 7.40 | 2.86 | 6.40 |
| (2) After Alcalase Treatment | | | |
| (a) % enzyme on wt. of guar gum | 0.50 | 0.5 | 0.50 |
| (b) % RAB | 5.47 | 2.56 | 4.79 |

These determinations were performed simultaneously.

EXAMPLE 5

The following example illustrates the superiority of spraying enzyme onto the solid guar over the method of adding enzyme to guar solution.

Three separate materials were prepared for the % RAB test (as described in Example 1).

1. 10.6 grams of Alcalase 0.6L (liquid) were sprayed onto 600 grams of guar gum powder while it was being mixed, and the solid powder was mixed thoroughly until it was uniform. This constituted a 1.7% enzyme mixture, based on the weight of the guar gum.
2. A gel solution of guar gum was prepared in preparation for the % RAB test as in Example 1. To this was added 1.7% of Alcalase 0.6L, based on weight of guar gum in solution.
3. Untreated guar gums.

Each of these three materials was treated for % RAB by the method described in Example 1.

The results were as follows:

| | % RAB |
|---|---|
| Guar gum sprayed with enzyme | 4.89 |
| Guar gum in water solution, to which enzyme was added | 5.52 |
| Untreated guar gum (control) | 7.43 |

These determinations were performed simultaneously.

The following example demonstrates that enzymes other than Alcalase 1.5P or Alcalase 0.6L also act to reduce the % RAB of guar gum. For this purpose the enzymes shown below were used in tests similar to the test in Example 1:

EXAMPLE 6

| | % Conc. of enzyme (Based on wt. of gum) | % RAB |
|---|---|---|
| Control - No enzyme | — | 6.90 |
| Bromelain Conc. | 1 | 5.47 |
| HT Proteolytic 200 | 1 | 5.83 |
| Papain 30,000 | 1 | 5.38 |
| Milezyme AFP | 1 | 5.24 |
| Cellulose TV Conc. | 1 | 5.41 |

All determinations were performed simultaneously.

The guar gum used in preparing the products of this invention may be in the form of guar splits, shredded guar, or guar powder. The aqueous solutions of the additives which are mixed with the guar may contain up to about 50% of water based on the weight of the guar. The following example is representative of this invention.

EXAMPLE 7

2320 lbs. of shredded guar gum (guar splits, or powdered guar may be used) were placed in a mixer. A solution of 1.06 lbs. of 50% aqueous sodium hydroxide, 2.25 lbs. of sodium bicarbonate, and 10 lbs. of Alcalase 1.5P in 450 lbs. of water was added slowly to the guar solids while they were being mixed at about 60° C. After thorough mixing, the product, upon analyses (Example 1) had a residue of 4.36% of insolubles. The untreated batch of guar splits used to make the product, had a residue of 6.88% of insolubles. Both determinations were performed simultaneously.

Although the above disclosure has been primarily concerned with aqueous solutions of the enzymatically treated guar gums, similar lowering of insolubles are effected in aqueous dispersion of such treated guar gums.

The invention claimed is:

1. In a method of recovering oil from an oil bearing formation by fracturing thereof, the step of inserting into said formation, at high pressure, an aqueous composition comprising guar gum in water, the guar gum having been first coated and impregnated, while in the solid particulate state, with an aqueous solution of a hydrolytic enzyme.

* * * * *